(12) United States Patent
Qian

(10) Patent No.: US 12,545,655 B2
(45) Date of Patent: Feb. 10, 2026

(54) METHOD FOR SYNTHESIZING OXETANE COMPOUND BY MICROREACTOR

(71) Applicants: CHANGZHOU TRONLY ADVANCED ELECTRONIC MATERIALS CO., LTD., Jiangsu (CN); CHANGZHOU TRONLY NEW ELECTRONIC MATERIALS CO., LTD., Jiangsu (CN)

(72) Inventor: Xiaochun Qian, Jiangsu (CN)

(73) Assignees: Changzhou Tronly Advanced Electronic Materials Co., Ltd., Jiangsu (CN); Changzhou Tronly New Electronic Materials Co., Ltd., Jiangsu (CN)

( * ) Notice: Subject to any disclaimer, the term of this patent is extended or adjusted under 35 U.S.C. 154(b) by 785 days.

(21) Appl. No.: 17/907,244

(22) PCT Filed: Mar. 16, 2021

(86) PCT No.: PCT/CN2021/081186
§ 371 (c)(1),
(2) Date: Sep. 23, 2022

(87) PCT Pub. No.: WO2021/197058
PCT Pub. Date: Oct. 7, 2021

(65) Prior Publication Data
US 2023/0150961 A1    May 18, 2023

(30) Foreign Application Priority Data

Apr. 3, 2020 (CN) .......................... 202010261428.7
Feb. 10, 2021 (CN) .......................... 202110184193.0

(51) Int. Cl.
*C07D 305/06* (2006.01)
*B01J 19/00* (2006.01)
*B01J 23/04* (2006.01)

(52) U.S. Cl.
CPC ........ *C07D 305/06* (2013.01); *B01J 19/0093* (2013.01); *B01J 23/04* (2013.01); *B01J 2219/0086* (2013.01); *B01J 2219/00891* (2013.01)

(58) Field of Classification Search
CPC ..... C07D 305/06; B01J 19/0093; B01J 23/04; B01J 2219/0086; B01J 2219/00891
USPC ....................................................... 549/510
See application file for complete search history.

(56) References Cited

U.S. PATENT DOCUMENTS

| 5,721,020 A | 2/1998 | Takami et al. |
| 6,166,228 A | 12/2000 | Gaudl et al. |
| 2011/0236269 A1 | 9/2011 | Inoue et al. |

FOREIGN PATENT DOCUMENTS

| CN | 1333763 A | 1/2002 |
| CN | 1144798 C | 4/2004 |
| CN | 103275112 | 9/2013 |
| CN | 110698437 A | 1/2020 |
| JP | H11-12261 | 1/1999 |
| JP | 2000-273093 | 10/2000 |
| JP | 3840695 B2 | 11/2006 |
| JP | 4604531 B2 | 1/2011 |
| JP | 2011-020004 | 2/2011 |
| JP | 5065550 B2 | 11/2012 |
| JP | 2017-133039 | 8/2017 |
| WO | WO 2010/032712 | 3/2010 |

OTHER PUBLICATIONS

Notice of Reasons for Refusal in Japanese Application No. 2022-557799, dated Aug. 22, 2023.
Office Action issued in Taiwanese Application No. 110112179, dated Nov. 4, 2021.
Extended European Search Report issued in European Application No. 21782226.1, dated Mar. 18, 2024.
Geyer et al., "Microreactors as the Key to the Chemistry Laboratory of the Future", Systems Chemistry, May 26-30, 2008, pp. 87-107.
Office Action issued in Korean Application No. 10-2022-7038089, dated Apr. 28, 2024.
Yao et al., "Review of the applications of microreactors", Renewable and Sustainable Energy Reviews, 2015, 47: 519-539.
Office Action of corresponding Chinese Patent Application No. 202110184193.0 issued on Feb. 6, 2024.
Han et al., "Synthesis and Properties of 3-Azidomethyl-3-Ethyloxetane and its Homopolymer", Chinese Journal of Explosives & Propellants, 29(5): 72-75 (2006).
International Search Report issued in International Application No. PCT/CN2021/081186, mailed on Jun. 18, 2021.
Pattison, D., "Cylic Ethers Made by Pyrolysis of Carbonate Esters", Natl. Sci. Library Chinese Academy of Sci., vol. 79, pp. 3455-3456 (1957).

(Continued)

*Primary Examiner* — Kristin A Vajda
(74) *Attorney, Agent, or Firm* — Knobbe, Martens, Olson & Bear, LLP

(57) ABSTRACT

A method is for synthesizing an oxetane compound by a microreactor. The synthesis method includes: introducing trimethylolpropane and carbonate into the microreactor in the presence of an alkaline catalyst, and synthesizing the oxetane compound by means of a micro-reaction continuous flow process under an inert solvent or a solvent-free condition. Compared with conventional reactors, the microreactor has the advantages of being high in heat transfer mass transfer coefficient, good in mixing performance, easy to control in temperature, safe and controllable in process. The three oxetane products are produced by utilizing the advantages of the microreactor, thereby greatly improving the mass transfer heat transfer performance of a reaction system, shortening the reaction time, improving the production efficiency, particularly avoiding the long-time high-temperature process in the pyrolysis process, reducing the production of high-boiling-point by-products, improving the yield, realizing continuity and automation of the process, and improving process safety.

15 Claims, 1 Drawing Sheet

(56) References Cited

OTHER PUBLICATIONS

Zhang et al., "Micro chemical Technology", Green Chemistry, in 14 pages (2014).
Final Office Action issued in Korean Patent Application No. 10-2022-7038089 dated Dec. 23, 2024 in 10 pages.
Office Action issued in Korean Application No. 10-2022-7038089, dated Sep. 16, 2025.

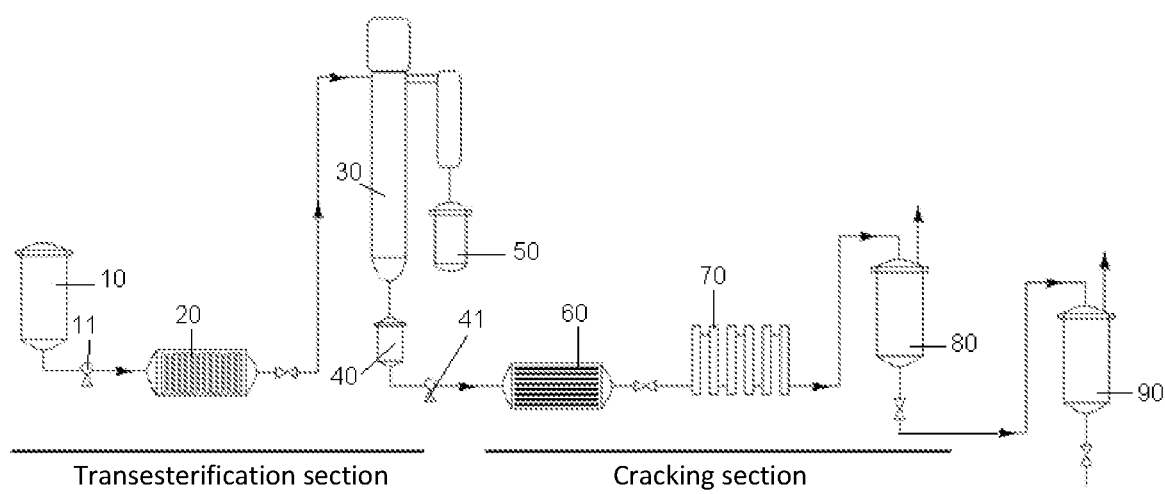

METHOD FOR SYNTHESIZING OXETANE COMPOUND BY MICROREACTOR

TECHNICAL FIELD

The invention relates to the field of organic synthesis, in particular to a method for synthesizing an oxetane compound by a microreactor.

BACKGROUND

3-Ethyl-3-hydroxymethyloxetane and bis[1-ethyl(3-oxetanyl)methyl]ether are the most widely used monomers in the photocurable cationic system and are extensively applied in the fields of photocurable coatings, inks, adhesives, and the like. Their structural formulas are as follows:

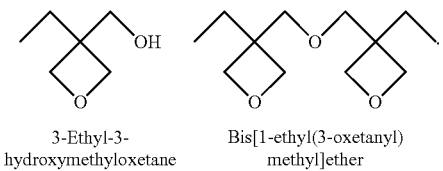

3-Ethyl-3-hydroxymethyloxetane    Bis[1-ethyl(3-oxetanyl)methyl]ether

The cyclocarbonate cracking method is commonly used in industry to prepare oxetane products. For example, the reaction process for producing 3-ethyl-3-hydroxymethyloxetane by the cyclocarbonate cracking method is as follows:

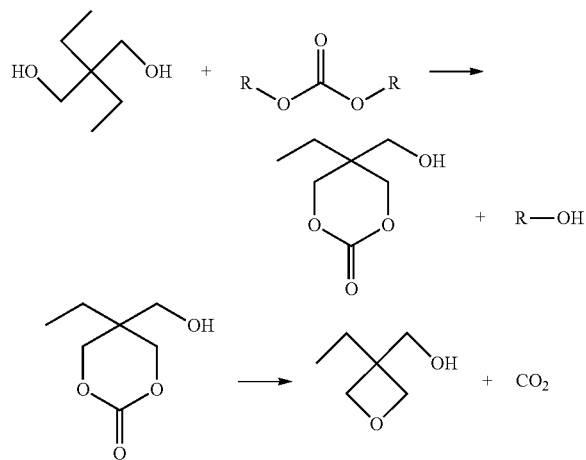

In the formula, R is alkyl, generally methyl or ethyl.

The process is as follows: trimethylolpropane and carbonate ester are subjected to the transesterification reaction in a rectifying still at a temperature of 80° C. to 120° C., the alcohol as by-product is continuously fractionated out during the reaction, the excess carbonate ester is removed by distillation after the reaction has been completed, and the transesterification procedure takes 10 h to 12 h; then the cracking procedure is started, wherein the cracking is conducted at a temperature of 160° C. to 200° C. for 12 h to 15 h to remove carbon dioxide and the finished product is finally obtained by rectification under negative pressure. The whole process takes 30 h to 40 h to complete, and the production efficiency is relatively low. The cracking reaction is conducted at high temperature for a long time, which will lead to the production of high-boiling by-products, so the yield of the finished product is low (65% to 75%), and a large amount of distillation residues will be generated after the completion of rectification, which can only be disposed as solid wastes.

In view of the existence of the above problems, it is necessary to provide a method for synthesizing an oxetane compound with relatively high yield and short reaction time.

SUMMARY

A main object of the invention is to provide a method for synthesizing an oxetane compound by a microreactor, so as to solve the problems present in the existing synthesis methods for oxetane compounds such as low yield and long reaction time. In view of this, the invention further provides a method for adjusting the product distribution by controlling relevant parameters in the reaction process, to realize the co-production of three oxetane compounds.

In order to achieve the above object, the invention provides a method for synthesizing an oxetane compound by a microreactor, including feeding trimethylolpropane and a carbonate ester into a microreactor in the presence of a basic catalyst, and synthesizing the oxetane compound under solvent or solvent-free condition through a microreaction continuous flow process.

Further, the basic catalyst comprises a first basic catalyst and a second basic catalyst, and the method for synthesizing an oxetane compound by a microreactor includes: continuously feeding the first basic catalyst, trimethylolpropane, and carbonate ester into a first microreactor for transesterification reaction, to obtain a reaction product system containing an esterified intermediate; extracting the esterified intermediate from the reaction product system containing the esterified intermediate; feeding the esterified intermediate and the second basic catalyst into a second microreactor for cracking reaction, to obtain a cracked reaction product system; and subjecting the cracked reaction product system to gas-liquid separation treatment, to obtain the oxetane compound.

Further, the solvent is one or more of the group consisting of halogenated hydrocarbons, benzene, toluene, xylene, nitrobenzene, and acetonitrile.

Further, the temperature of the first microreactor is 50 to 300° C., the residence time of the first microreactor is 1 to 60 min; and the reaction temperature of the second microreactor is 150 to 400° C., and the residence time of the second microreactor is 1 to 8 min.

Further, the temperature of the first microreactor is 100 to 200° C.; and the reaction temperature of the second microreactor is 200 to 300° C.

Further, the molar ratio of trimethylolpropane to carbonate ester is 1:(1 to 5), and the content of the basic catalyst is 100 ppm to 50,000 ppm.

Further, the molar ratio of trimethylolpropane to carbonate ester is 1:(1.5 to 3), and the content of the basic catalyst is 100 ppm to 10,000 ppm.

Further, the carbonate ester is selected from one or more of the group consisting of dimethyl carbonate, diethyl carbonate, and dipropyl carbonate; and the basic catalyst is selected from one or more of alkali metal hydroxides, sodium alkoxides, potassium alkoxides, or alkali metal carbonates.

Further, the first basic catalyst and the second basic catalyst are independently selected from one or more of alkali metal hydroxides, sodium alkoxides, potassium alkoxides, or alkali metal carbonates, respectively; preferably, the first basic catalyst and the second basic catalyst are independently selected from one or more of the group consisting of sodium methoxide, sodium ethoxide, lithium hydroxide, sodium hydroxide, potassium hydroxide, lithium carbonate, sodium carbonate, and potassium carbonate, respectively; preferably, the amount of the first basic catalyst is 200 to 500 ppm, and the amount of the second basic catalyst is 300 to 3,000 ppm.

Further, in the process of the cracking reaction, the synthesis method further includes: adding water to the esterified intermediate, and the water content of the system in the process of the cracking reaction is 10 to 100,000 ppm.

Further, the first microreactor has a reaction channel having an inner diameter selected from 200 to 10,000 μm, and the second microreactor has a reaction channel having an inner diameter independently selected from 200 to 10,000 μm respectively; preferably, the first microreactor has a reaction channel having an inner diameter selected from 200 to 2,000 μm, and the second microreactor has a reaction channel having an inner diameter selected from 500 to 10,000 μm.

Further, the device used in the extraction process is selected from a thin-film evaporator or a rectification tower.

By applying the technical solution of the invention, the microreactor has the advantages such as high heat and mass transfer coefficient, good mixing performance, easy temperature control, and safe and controllable process as compared to conventional reactors. Making use of the advantages of the microreactor to produce the above three oxetane products can greatly improve the mass and heat transfer performances of the reaction system, reduce the reaction time, improve the production efficiency, especially avoid the long-term high temperature process in the cracking procedure and reduce the production of high-boiling by-products, improve the yield, realize the process continuity and automation, and improve the process safety. In addition, the above synthesis process requires small size for reaction device, small floor space for production site, and less human resources, and has high safety.

BRIEF DESCRIPTION OF THE DRAWINGS

The accompanying drawing as a part of the subject application is used to provide further understandings on the invention. The exemplary embodiments and their descriptions in the invention are used to explain the invention and do not serve as improper limitations to the invention. In the accompanying drawing:

FIG. 1 shows a schematic diagram for the structure of a synthesis device for oxetane compound provided according to a typical embodiment of invention.

The above drawing includes the following reference signs:

10. Raw material storage tank; 11. First feeding pump; 20. First microreactor; 30. Thin-film evaporator; 40. Esterified intermediate storage tank; 41. Second feeding pump; 50. Light end collection tank; 60. Second microreactor; 70. Micro heat exchanger; 80. Gas-liquid separation tank; 90. Rectification device.

DETAILED DESCRIPTION OF THE PREFERRED EMBODIMENTS

It should be noted that, in the case of no conflict, the embodiments in the subject application as well as the features therein can be combined with each other. The invention will be described in detail below with reference to the embodiments.

As described in the background, the existing synthesis methods for oxetane compounds have problems such as low yield and long reaction time. In order to solve the above technical problems, the invention provides a method for synthesizing an oxetane compound by a microreactor, including: feeding trimethylolpropane and a carbonate ester into a microreactor in the presence of a basic catalyst, and synthesizing the oxetane compound under inert solvent or solvent-free condition through a microreaction continuous flow process.

The microreactor has the advantages such as high heat and mass transfer coefficient, good mixing performance, easy temperature control, and safe and controllable process as compared to conventional reactors. Making use of the advantages of the microreactor to produce the above three oxetane products can greatly improve the mass and heat transfer performances of the reaction system, reduce the reaction time, improve the production efficiency, especially avoid the long-term high temperature process in the cracking procedure and reduce the production of high-boiling by-products, improve the yield, realize the process continuity and automation, and improve the process safety. In addition, the above synthesis process requires small size for reaction device, small floor space for production site, and less human resources, and has high safety.

In a preferred embodiment, the basic catalyst comprises a first basic catalyst and a second basic catalyst, and the method for synthesizing an oxetane compound by a microreactor includes: continuously feeding the first basic catalyst, trimethylolpropane, and carbonate ester into a first microreactor for transesterification reaction, to obtain a reaction product system containing an esterified intermediate; extracting the esterified intermediate from the reaction product system containing the esterified intermediate; feeding the esterified intermediate and the second basic catalyst into a second microreactor for cracking reaction, to obtain a cracked reaction product system; and subjecting the cracked reaction product system to gas-liquid separation treatment, to obtain the oxetane compound.

After the above gas-liquid separation, the resulting product is a mixture, which can be further separated by those skilled in the art as required. The separation method includes but is not limited to distillation.

The solvent used in the above synthesis method can be selected from those commonly used in the art. In a preferred embodiment, the solvent includes but is not limited to one or more of the group consisting of halogenated hydrocarbons, benzene, toluene, xylene, nitrobenzene, and acetonitrile. Under comprehensive consideration of cost factors, the solvent-free condition is preferred.

In a preferred embodiment, the temperature of the first microreactor is 50 to 300° C., the residence time of the first microreactor is 1 to 60 min; and the reaction temperature of the second microreactor is 150 to 400° C., and the residence time of the second microreactor is 1 to 8 min.

Compared with the uncontrollability of the product composition in the conventional process, limiting the process conditions of the transesterification reaction and the cracking reaction to the above ranges in the subject application can improve the total yield of oxetane products. At the same time, the method of the subject application can also control the distribution of different products, realize the co-production of three oxetane compounds, and improve the economic values. For example, the temperature of the first microreactor can be 50° C., 80° C., 100° C., 160° C., 200° C., or 300° C.; and the reaction temperature of the second microreactor can be 150° C., 200° C., 260° C., 300° C., or 400° C.

In a preferred embodiment, the temperature of the first microreactor is 100 to 200° C.; and the reaction temperature of the second microreactor is 200 to 300° C. The temperature of the first microreactor and the temperature of the second microreactor include but are not limited to the above ranges, while limiting them to the above ranges is beneficial to further improving the yield of target product and shortening the reaction time.

In a preferred embodiment, in the process of transesterification reaction, the molar ratio of trimethylolpropane to carbonate ester is 1:(1 to 5), and the content of the basic catalyst is 100 ppm to 50,000 ppm. The amounts of trimethylolpropane, carbonate ester, and basic catalyst include but are not limited to the above ranges, while limiting them to the above ranges is beneficial to further improving the conversion rate of reaction raw materials. More preferably, the molar ratio of trimethylolpropane to carbonate ester is 1:(1.5 to 3), and the content of the basic catalyst is 100 ppm to 10,000 ppm.

In the above synthesis method, the carbonate ester and the basic catalyst can be selected from those commonly used in the art. In a preferred embodiment, the carbonate ester includes but is not limited to one or more of the group consisting of dimethyl carbonate, diethyl carbonate, and dipropyl carbonate.

In a preferred embodiment, the first basic catalyst and the second basic catalyst are independently selected from one or more of hydroxides formed by alkali metals, sodium alkoxides, potassium alkoxides, and carbonates formed by alkali metals, respectively. More preferably, the first basic catalyst and the second basic catalyst are independently selected from one or more of the group consisting of sodium methoxide, sodium ethoxide, lithium hydroxide, sodium hydroxide, potassium hydroxide, lithium carbonate, sodium carbonate, and potassium carbonate.

In order to further improve the catalytic effect and shorten the reaction time, further preferably, the first basic catalyst and the second basic catalyst are independently selected from one or more of sodium methoxide, sodium ethoxide, sodium hydroxide, or potassium hydroxide, respectively; and the amount of the first basic catalyst is 200 to 500 ppm, and the amount of the second basic catalyst is 300 to 3,000 ppm.

In a preferred embodiment, in the process of the cracking reaction, the above synthesis method further includes: adding water to the esterified intermediate, and the water content of the system in the process of the cracking reaction is 10 to 100,000 ppm. Compared with other ranges, limiting the water content of the system in the process of the cracking reaction to the above range is beneficial to improving the cracking rate of the esterified intermediate, thereby contributing to the yield of the oxetane compound.

In a preferred embodiment, the first microreactor has a reaction channel having an inner diameter selected from 200 to 10,000 μm, and the second microreactor has a reaction channel having an inner diameter selected from 200 to 10,000 μm. Compared with other ranges, limiting the reaction channel of the first microreactor and the reaction channel of the second microreactor to the above ranges is beneficial to improving the yield of the target product. For example, the first microreactor can have a reaction channel having an inner diameter selected from 200 μm, 500 μm, 1,000 μm, 5,000 μm, or 10,000 μm, and the second microreactor can have a reaction channel having an inner diameter selected from 200 μm, 500 μm, 1,000 μm, 8,000 μm, or 10,000 μm. More preferably, the first microreactor has a reaction channel having an inner diameter selected from 200 to 2,000 μm, and the second microreactor has a reaction channel having an inner diameter selected from 500 to 10,000 μm.

In order to further improve the purity of the target product and reduce the energy loss of the synthesis method, preferably, the above synthesis method further includes subjecting the cracked reaction product system to heat exchange in a micro heat exchanger, removing carbon dioxide through a gas-liquid separation device, and then rectificating it, to obtain the desired product.

The subject application is further described in detail below with reference to specific examples, which cannot be understood as limiting the claimed scope in the subject application.

The microchannel device system used in Examples 1 to 5 was provided by Shanghai Timo Fluid Technology Co., Ltd. (model: Shanghai Timo TMP/53047-32-3/A2000), wherein the first microreactor had a reaction channel having an inner diameter of 1,000 μm, and the second microreactor had a reaction channel having an inner diameter of 8,000 μm.

In the examples, the device shown in FIG. 1 was used to prepare the oxetane compound, and the synthesis method included the following steps:

Transesterification section: trimethylolpropane (TMP) and dimethyl carbonate (DMC) were mixed at a certain molar ratio, and a stoichiometric amount of a basic catalyst was added based on the weight of TMP, mixed well, and placed in the raw material storage tank 10 to be preheated; the mixture was fed through the first feeding pump 11 into the first microreactor 20 for transesterification reaction, and remained for certain time, to obtain a reaction product system containing an esterified intermediate; methanol and remaining DMC were removed from the above reaction product system containing an esterified intermediate in the thin-film evaporator 30, the recovered raw materials were placed in the light end collection tank 50, and the esterified intermediate was stored in the esterified intermediate storage tank 40.

Cracking section: a basic catalyst was added into the esterified intermediate, and an appropriate amount of water was selectively added and mixed well; then the mixture was fed through the second feeding pump 41 into the second microreactor 60 and remained for certain time to carry out the cracking reaction; after having been cooled through the micro heat exchanger 70, it was fed into the gas-liquid separation tank 80 to remove carbon dioxide, to obtain a crude product;

Product separation: the crude product was fed to the rectification device 90 for rectification separation, to obtain the corresponding product.

The process parameters in Examples 1 to 5 were shown in Table 1.

TABLE 1

| Section | Parameter | Example 1 | Example 2 | Example 3 | Example 4 | Example 5 |
|---|---|---|---|---|---|---|
| Transesterification | Weight of TMP, g | 402.0 | 402.0 | 402.0 | 402.0 | 402.0 |
| | n (TMP):n (DMC) | 1:1.5 | 1:3 | 1:3 | 1:2.25 | 1:2.25 |
| | Content of catalyst (NaOH), ppm | 300 | 300 | 300 | 300 | 300 |
| | Flow rate for the first feeding pump, mL/min | 10.3 | 15.5 | 15.5 | 12.4 | 12.4 |
| | Reaction temperature, °C. | 100 | 120 | 120 | 120 | 120 |
| | Residence time, min | 12 | 15 | 15 | 13 | 13 |
| Cracking Reaction | Water content, ppm | 30,000 | 80 | 80 | 80 | 80 |
| | Content of catalyst (KOH), ppm | 300 | 3,000 | 300 | 300 | 3,000 |
| | Flow rate for the second feeding pump, mL/min | 8.2 | 8.6 | 8.6 | 8.3 | 8.3 |
| | Cracking temperature, °C. | 300 | 300 | 260 | 260 | 300 |
| | Pressure, MPa | 3.0 to 3.5 | 3.0 to 3.5 | 3.0 to 3.5 | 3.0 to 3.5 | 3.0 to 3.5 |
| | Residence time, min | 6 | 8 | 1 | 1 | 6 |
| Product Separation | Total yield, % | 92.3 | 93.4 | 96.1 | 95.7 | 94.0 |
| | Product proportion (%) A:B:C | 96.4:0.8:2.8 | 6.1:92.8:1.1 | 2.5:5.6:91.9 | 56.3:1.4:42.3 | 58.4:40.9:0.7 |

The products in Table 1 have the following structures:
Product A: 3-ethyl-3-hydroxymethyloxetane

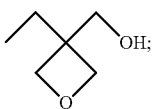

Product B: bis[1-ethyl(3-oxetanyl)methyl]ether

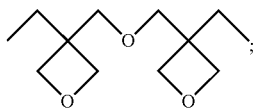

Product C: bis[1-ethyl(3-oxetanyl)methyl]carbonate

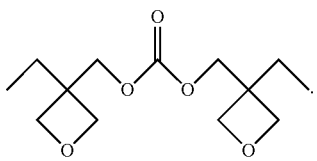 [SMILES: CCC1(COC(=O)OCC2(CC)COC2)COC1]

Example 6

It differed from Example 1 in that: the reaction temperature of the transesterification reaction was 80° C., and the temperature of the cracking reaction was 300° C.

The total yield of products was 83.4%, wherein the proportions (%) of products A, B, and C were 95.7%, 1.2%, and 3.1%, respectively.

Example 7

It differed from Example 1 in that: the reaction temperature of the transesterification reaction was 160° C., and the temperature of the cracking reaction was 260° C.

The total yield of products was 90.8%, wherein the proportions (%) of products A, B, and C were 92.0%, 4.6%, and 3.4%, respectively.

Example 8

It differed from Example 1 in that: the molar ratio of trimethylolpropane to carbonate ester was 1:1, and the content of the basic catalyst in the transesterification reaction was 800 ppm.

The total yield of products was 80.7%, wherein the proportions (%) of products A, B, and C were 94.5%, 3.3%, and 2.2%, respectively.

Example 9

It differed from Example 1 in that: the molar ratio of trimethylolpropane to carbonate ester was 5:1, and the content of the basic catalyst in the transesterification reaction was 100 ppm.

The total yield of products was 84.7%, wherein the proportions (%) of products A, B, and C were 95.1%, 2.9%, and 2.0%, respectively.

Example 10

It differed from Example 1 in that: the reaction temperature of the transesterification reaction was 50° C., the residence time of the transesterification reaction was 60 min, and the temperature of the cracking reaction was 400° C.

The total yield of products was 85.7%, wherein the proportions (%) of products A, B, and C were 98.3%, 1.3%, and 0.4%, respectively.

Example 11

It differed from Example 1 in that: the reaction temperature of the transesterification reaction was 300° C., the residence time of the transesterification reaction was 1 min, and the temperature of the cracking reaction was 200° C.

The total yield of products was 86.2%, wherein the proportions (%) of products A, B, and C were 39.5%, 46.9%, and 13.6%, respectively.

Example 12

It differed from Example 1 in that: the reaction temperature of the transesterification reaction was 200° C., the residence time of the transesterification reaction was 30 min, and the temperature of the cracking reaction was 150° C.

The total yield of products was 96.8%, wherein the proportions (%) of products A, B, and C were 29.3%, 50.1%, and 20.6%, respectively.

Example 13

It differed from Example 1 in that: the content of the basic catalyst in the transesterification reaction was 50,000 ppm.

The total yield of products was 91.3%, wherein the proportions (%) of products A, B, and C were 95.2%, 2.0%, and 2.8%, respectively.

Example 14

It differed from Example 1 in that: the content of the basic catalyst in the transesterification reaction was 10,000 ppm.

The total yield of products was 93.4%, wherein the proportions (%) of products A, B, and C were 96.8%, 1.2%, and 2.0%, respectively.

Example 15

It differed from Example 1 in that: the content of the basic catalyst in the transesterification reaction was 30,000 ppm.

The total yield of products was 91.8%, wherein the proportions (%) of products A, B, and C were 95.3%, 1.6%, and 3.1%, respectively.

Example 16

It differed from Example 1 in that: the content of the basic catalyst in the transesterification reaction was 8,000 ppm.

The total yield of products was 93.1%, wherein the proportions (%) of products A, B, and C were 96.0%, 1.8%, and 2.2%, respectively.

Example 17

It differed from Example 1 in that: the content of the basic catalyst in the transesterification reaction was 5,000 ppm.

The total yield of products was 92.8%, wherein the proportions (%) of products A, B, and C were 96.2%, 1.9%, and 2.3%, respectively.

Example 18

It differed from Example 1 in that: the first microreactor had a reaction channel having an inner diameter of 100 μm, and the second microreactor had a reaction channel having an inner diameter of 100 μm.

The total yield of products was 81.3%, wherein the proportions (%) of products A, B, and C were 95.6%, 1.0%, and 3.4%, respectively.

Example 19

It differed from Example 1 in that: the first microreactor had a reaction channel having an inner diameter of 10,000 μm, and the second microreactor had a reaction channel having an inner diameter of 10,000 μm.

The total yield of products was 91.8%, wherein the proportions (%) of products A, B, and C were 95.5%, 2.0%, and 2.5%, respectively.

Example 20

It differed from Example 1 in that: the first microreactor had a reaction channel having an inner diameter of 200 μm, and the second microreactor had a reaction channel having an inner diameter of 200 μm.

The total yield of products was 90.7%, wherein the proportions (%) of products A, B, and C were 94.9%, 2.1%, and 3.0%, respectively.

Example 21

It differed from Example 1 in that: the catalyst in the cracking reaction was sodium methoxide and the content thereof was 1,000 ppm, and the water content of the cracking reaction was 100,000 ppm.

The total yield of products was 93.5%, wherein the proportions (%) of products A, B, and C were 97.2%, 2.0%, and 0.8%, respectively.

Example 22

It differed from Example 1 in that: the catalyst in the transesterification reaction was sodium methoxide and the content thereof was 10,000 ppm, the catalyst in the cracking reaction was sodium methoxide and the content thereof was 1,000 ppm, and the water content of the cracking reaction was 100,000 ppm.

The total yield of products was 95.8%, wherein the proportions (%) of products A, B, and C were 97.5%, 1.9%, and 0.6%, respectively.

Example 23

It differed from Example 1 in that: the catalyst in the transesterification reaction was sodium methoxide and the content thereof was 10,000 ppm, the catalyst in the cracking reaction was sodium methoxide and the content thereof was 300 ppm, and the water content of the cracking reaction was 10 ppm.

The total yield of products was 96.5%, wherein the proportions (%) of products A, B, and C were 3.5%, 94.6%, and 1.9%, respectively.

Example 24

It differed from Example 1 in that: the temperature of the cracking reaction was 100° C.

The total yield of products was 66.8%, wherein the proportions (%) of products A, B, and C were 3.9%, 1.7%, and 94.4%, respectively.

Example 25

It differed from Example 1 in that: the temperature of the cracking reaction was 450° C.

The total yield of products was 82.9%, wherein the proportions (%) of products A, B, and C were 43.4%, 56.5%, and 0.1%, respectively.

Example 26

It differed from Example 1 in that: the temperature for transesterification was 30° C.

The total yield of products was 78.6%, wherein the proportions (%) of products A, B, and C were 94.1%, 2.4%, and 3.5%, respectively.

Example 27

It differed from Example 1 in that: the temperature for transesterification was 350° C.

The total yield of products was 79.0%, wherein the proportions (%) of products A, B, and C were 94.5%, 2.6%, and 2.9%, respectively.

In the Comparative Examples, a conventional reaction device was used to prepare the oxetane compound, and the synthesis method included the following steps:

(1) Transesterification section: TMP, DMC, and toluene were charged into a stainless steel stirred tank with rectification tower and condenser, stirred and mixed well, then a catalyst was added; the mixture was heated for reaction; the generated methanol was collected at the top of the tower, until there was no methanol distilled out from the top of the tower; it was continued to be distilled by heating to remove the solvent toluene and remaining DMC, to obtain an esterified intermediate;

(2) Cracking section: a basic catalyst was added and an appropriate amount of water was selectively added for cracking at a certain temperature and under negative pressure while distilling, to obtain a product.

The process parameters in Comparative Examples 1 to 5 were shown in Table 2.

From the results in the Comparative Examples, it can be seen that the production yield by the conventional tank reactor is lower than that of the microchannel device system, and the selectivity of bis[1-ethyl(3-oxetanyl)methyl]ether is significantly lower than expectation and cannot meet the design requirements for product distribution.

Based on the above descriptions, by comparing Examples 1 to 27 and Comparative Examples 1 to 5, it can be seen that the above embodiments of the invention achieve the following technical effects: the synthesis method provided by the subject application can greatly improve the yield of three oxetane compounds, shorten the reaction time, while realizing the co-production of three oxetane compounds.

By comparing Examples 1, 6, 7, 10 to 12, and 24 to 27, it can be seen that limiting the temperatures of the transesterification reaction and the cracking reaction to the preferred ranges of the subject application is beneficial to improving the total yield of three oxetane compounds, and can control the proportions of three products by controlling the cracking temperature.

By comparing Examples 1, 8, 9, 13 to 17, 21, and 23, it can be seen that limiting the molar ratio of trimethylolpropane to carbonate ester, the content of the basic catalyst used in the transesterification reaction, and the content of the basic catalyst used in the cracking reaction to the preferred ranges of the subject application is beneficial to improving the total yield of three oxetane compounds.

By comparing Examples 1, 18, 19, and 20, it can be seen that limiting the inner diameters of the channels of the first and second microreactors to the preferred ranges of the subject application is beneficial to improving the total yield of three oxetane compounds.

The above descriptions are merely preferred embodiments of the invention and are not intended to limit the invention. For those skilled in the art, the invention may have various modifications and changes. Any modification, equivalent replacement, and improvement made within the spirit and principle of the invention shall be included within the scope of the invention.

TABLE 2

| Section | Parameter | Comparative Example 1 | Comparative Example 2 | Comparative Example 3 | Comparative Example 4 | Comparative Example 5 |
|---|---|---|---|---|---|---|
| Transesterification | TMP, g | 402.0 | 402.0 | 402.0 | 402.0 | 402.0 |
| | Toluene, g | 300.0 | 300.0 | 300.0 | 300.0 | 300.0 |
| | n (TMP):n (DMC) | 1:1.5 | 1:3 | 1:3 | 1:2.25 | 1:2.25 |
| | Content of catalyst (NaOH), ppm | 300 | 300 | 300 | 300 | 300 |
| | Reaction temperature, ° C. | 80 to 120 | 80 to 120 | 80 to 120 | 80 to 120 | 80 to 120 |
| | Reaction time, h | 6 | 8 | 8 | 8 | 8 |
| Cracking | Water content, ppm | 30,000 | 80 | 80 | 80 | 80 |
| | Content of catalyst (KOH), ppm | 300 | 3,000 | 300 | 300 | 3,000 |
| | Cracking temperature, ° C. | 160 to 200 | 160 to 260 | 160 to 190 | 160 to 200 | 160 to 260 |
| | Pressure, MPa | −0.1 | −0.1 | −0.1 | −0.1 | −0.1 |
| | Cracking time, h | 10 | 12 | 8 | 8 | 12 |
| Product Separation | Total yield, % | 72.3 | 67.5 | 77.4 | 71.8 | 66.0 |
| | Product proportion, % A:B:C | 89.9:0.7:9.7 | 4.1:21.7:74.2 | 5.3:0.2:94.5 | 52.7:0.3:47.0 | 52.0:10.6:37.4 |

What is claimed is:

1. A method for synthesizing an oxetane compound by a microreactor, wherein the method for synthesizing an oxetane compound by a microreactor includes feeding trimethylolpropane and a carbonate ester into the microreactor in the presence of a basic catalyst, and synthesizing the oxetane compound under solvent or solvent-free condition through a microreaction continuous flow process.

2. The method for synthesizing an oxetane compound by a microreactor according to claim 1, wherein the basic catalyst comprises a first basic catalyst and a second basic catalyst, and the method for synthesizing an oxetane compound by a microreactor include:
continuously feeding the first basic catalyst, the trimethylolpropane, and the carbonate ester to a first microreactor for transesterification reaction, to obtain a reaction product system containing an esterified intermediate;
extracting the esterified intermediate from the reaction product system containing the esterified intermediate;
feeding the esterified intermediate and the second basic catalyst into a second microreactor for cracking reaction, to obtain a cracked reaction product system; and
subjecting the cracked reaction product system to gas-liquid separation treatment, to obtain the oxetane compound.

3. The method for synthesizing an oxetane compound by a microreactor according to claim 1, wherein the solvent is one or more of the group consisting of halogenated hydrocarbons, benzene, toluene, xylene, nitrobenzene, and acetonitrile.

4. The method for synthesizing an oxetane compound by a microreactor according to claim 2, wherein the temperature of the first microreactor is 50 to 300° C., and the residence time of the first microreactor is 1 to 60 min; and the reaction temperature of the second microreactor is 150 to 400° C., and the residence time of the second microreactor is 1 to 8 min.

5. The method for synthesizing an oxetane compound by a microreactor according to claim 4, wherein the temperature of the first microreactor is 100 to 200° C.; and the reaction temperature of the second microreactor is 200 to 300° C.

6. The method for synthesizing an oxetane compound by a microreactor according to claim 2, wherein the molar ratio of the trimethylolpropane to the carbonate ester is 1:(1 to 5), and the content of the basic catalyst is 100 ppm to 50,000 ppm.

7. The method for synthesizing an oxetane compound by a microreactor according to claim 6, wherein the molar ratio of the trimethylolpropane to the carbonate ester is 1:(1.5 to 3), and the content of the basic catalyst is 100 ppm to 10,000 ppm.

8. The method for synthesizing an oxetane compound by a microreactor according to claim 6, wherein the carbonate ester is selected from one or more of the group consisting of dimethyl carbonate, diethyl carbonate, and dipropyl carbonate; and
the basic catalyst is selected from one or more of alkali metal hydroxides, sodium alkoxides, potassium alkoxides, and alkali metal carbonates.

9. The method for synthesizing an oxetane compound by a microreactor according to claim 8, wherein the first basic catalyst and the second basic catalyst are independently selected from one or more of alkali metal hydroxides, sodium alkoxides, potassium alkoxides, and alkali metal carbonates, respectively.

10. The method for synthesizing an oxetane compound by a microreactor according to claim 2, wherein in the process of the cracking reaction, the synthesis method further includes: adding water to the esterified intermediate, and the water content of the system in the process of the cracking reaction is 10 to 100,000 ppm.

11. The method for synthesizing an oxetane compound by a microreactor according to claim 2, wherein the first microreactor has a reaction channel having an inner diameter selected from 200 to 10,000 μm, and the second microreactor has a reaction channel having an inner diameter selected from 200 to 10,000 μm.

12. The method for synthesizing an oxetane compound by a microreactor according to claim 2, wherein the device used in the extraction process is selected from a thin-film evaporator or a rectification tower.

13. The method for synthesizing an oxetane compound by a microreactor according to claim 9, wherein the first basic catalyst and the second basic catalyst are independently selected from one or more of the group consisting of sodium methoxide, sodium ethoxide, lithium hydroxide, sodium hydroxide, potassium hydroxide, lithium carbonate, sodium carbonate, and potassium carbonate, respectively.

14. The method for synthesizing an oxetane compound by a microreactor according to claim 9, wherein the amount of the first basic catalyst is 200 to 500 ppm, and the amount of the second basic catalyst is 300 to 3,000 ppm.

15. The method for synthesizing an oxetane compound by a microreactor according to claim 11, wherein the first microreactor has a reaction channel having an inner diameter selected from 200 to 2,000 μm, and the second microreactor has a reaction channel having an inner diameter selected from 500 to 10,000 μm.

* * * * *